United States Patent
Dunford et al.

(10) Patent No.: US 11,396,962 B2
(45) Date of Patent: Jul. 26, 2022

(54) ARCUATE THREAD FORM FIT (71) Applicant: FERMATA TECHNOLOGIES, LLC, Houston, TX (US)

(72) Inventors: Douglas William Dunford, Odessa, TX (US); David John Green, Cypress, TX (US)

(73) Assignee: FERMATA TECHNOLOGIES, LLC, Houston, TX (US)

( * ) Notice: Subject to any disclaimer, the term of this patent is extended or adjusted under 35 U.S.C. 154(b) by 79 days.

(21) Appl. No.: 16/895,540

(22) Filed: Jun. 8, 2020

(65) Prior Publication Data
US 2020/0386351 A1 Dec. 10, 2020

Related U.S. Application Data (60) Provisional application No. 62/858,183, filed on Jun. 6, 2019.

(51) Int. Cl.
*F16L 15/06* (2006.01)
*E21B 17/042* (2006.01)
*F16L 15/00* (2006.01)

(52) U.S. Cl.
CPC ............ *F16L 15/06* (2013.01); *E21B 17/042* (2013.01); *F16L 15/001* (2013.01)

(58) Field of Classification Search
CPC .............................. F16L 15/06; E21B 17/042
USPC ....................................................... 285/334
See application file for complete search history.

(56) References Cited

U.S. PATENT DOCUMENTS

| 4,332,502 | A | 6/1982 | Wormald et al. |
| 4,549,754 | A | 10/1985 | Saunders et al. |
| 4,861,209 | A | 8/1989 | Larsson |
| 4,865,364 | A | 9/1989 | Nobileau |
| 5,788,401 | A | 8/1998 | Drenth |
| 6,322,110 | B1 * | 11/2001 | Banker ................. E21B 17/042 |
| | | | 285/333 |
| 6,467,818 | B1 | 10/2002 | Snapp et al. |
| 6,848,724 | B2 | 2/2005 | Kessler |

(Continued)

FOREIGN PATENT DOCUMENTS

| FR | 2820806 A1 * | 8/2002 | .............. F16L 15/06 |
| WO | WO-2018180218 A1 * | 10/2018 | .............. F16L 15/06 |

OTHER PUBLICATIONS

ISRWO of related PCT/US2020/036637 dated Sep. 23, 2020.

*Primary Examiner* — David Bochna
(74) *Attorney, Agent, or Firm* — Vorys, Sater, Seymour and Pease LLP (57) ABSTRACT

A threaded pipe connection includes a first tubular member having a pin end defining external threads, a second tubular member having a box end defining internal threads threadably engageable with the external threads of the pin end, and a thread profile that defines at least a portion of one of the internal or external threads and includes a crest, a root, and a transition surface extending between the crest and the root. The transition surface includes a first arcuate surface extending from a top of the crest at a first radius, a second arcuate surface extending from the first arcuate surface at a second radius, and a third arcuate surface extending from the second arcuate surface at a third radius. The first radius and the third radius are each smaller than the second radius.

18 Claims, 6 Drawing Sheets

(56) References Cited

U.S. PATENT DOCUMENTS

| | | | |
|---|---|---|---|
| 7,549,682 B2* | 6/2009 | Pallini, Jr | F16L 15/004 |
| | | | 285/333 |
| 7,900,975 B2 | 3/2011 | Nakamura et al. | |
| 9,869,414 B2* | 1/2018 | Banker | E21B 17/042 |
| 9,874,058 B2 | 1/2018 | Benedict | |
| 10,041,307 B2 | 8/2018 | Muradov et al. | |
| 2012/0068458 A1* | 3/2012 | Granger | E21B 17/042 |
| | | | 285/334 |
| 2012/0298249 A1* | 11/2012 | Banker | F16L 15/06 |
| | | | 285/334 |
| 2021/0254763 A1* | 8/2021 | Sugino | F16L 15/06 |

\* cited by examiner

ARCUATE THREAD FORM FIT

BACKGROUND

In the oil and gas industry, several types of tubing and pipe are used in exploration, completion, and production operations to extract hydrocarbons from subterranean hydrocarbon-bearing formations. Typical types of oilfield tubing include drill pipe, casing (or liner), and production tubing. Relatively short pipe sections of 30 to 40 ft. or so in length are commonly coupled end-to-end to make a long string of tubing used to drill or complete a well, or to extract hydrocarbons from a completed well. Connected sections of drill pipe form a drill string used to deepen or work over the well, casing or liner pipe is used to encase the walls of the drilled wellbore and provide structural support for the well, and production pipe is used to convey the subsurface oil or gas to the well surface.

Each of the different types of pipe has a threaded end configuration specially designed to meet its intended purpose as it structurally secures and seals the pipe ends together. Common threaded connections include a male threaded member or "pin" at the end of a tubular section, which engages a female threaded member or "box" at the end of an adjoining tubular section. The box may be formed as an integral part of the tubular section or it may be formed by securing a coupling to a pin end of a tubular pipe section.

Threaded connections of oilfield tubulars generally engage each other in an interference fit, a shouldering fit, or a combination of interference and shouldering fits. In an interference fit, tapered pin and box ends are tightly wedged together as the pin threadably advances into the box. The resulting interference fit provides both structural and sealing connections between the pin and box ends. In contrast, a shouldering connection engages an annular shoulder on the pin end with an annular shoulder provided on the box end. The threads of the shouldering connection provide the structure holding the pin and box ends together, and the engaged shoulders help facilitate a sealed engagement.

Interference and shouldering threaded connections tend to fail in areas of stress concentrations that occur during makeup and working of the connections. A variety of thread designs, forms, and profiles have been suggested and introduced to change the distribution of torque stresses along the threaded connections of oilfield tubing.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

This present disclosure is related to threaded connections and, more particularly, to threaded connections for downhole tubulars and pipes.

Embodiments disclosed herein describe threaded pipe connections that include a first tubular member having a pin end defining external threads, a second tubular member having a box end defining internal threads threadably engageable with the external threads of the pin end, and a thread profile that defines at least a portion of one of the internal or external threads and includes a crest, a root, and a transition surface extending between the crest and the root. The transition surface may include a first arcuate surface extending from a top of the crest at a first radius, a second arcuate surface extending from the first arcuate surface at a second radius, and a third arcuate surface extending from the second arcuate surface at a third radius. In some embodiments, the first radius and the third radius are each smaller than the second radius.

Figure 1:
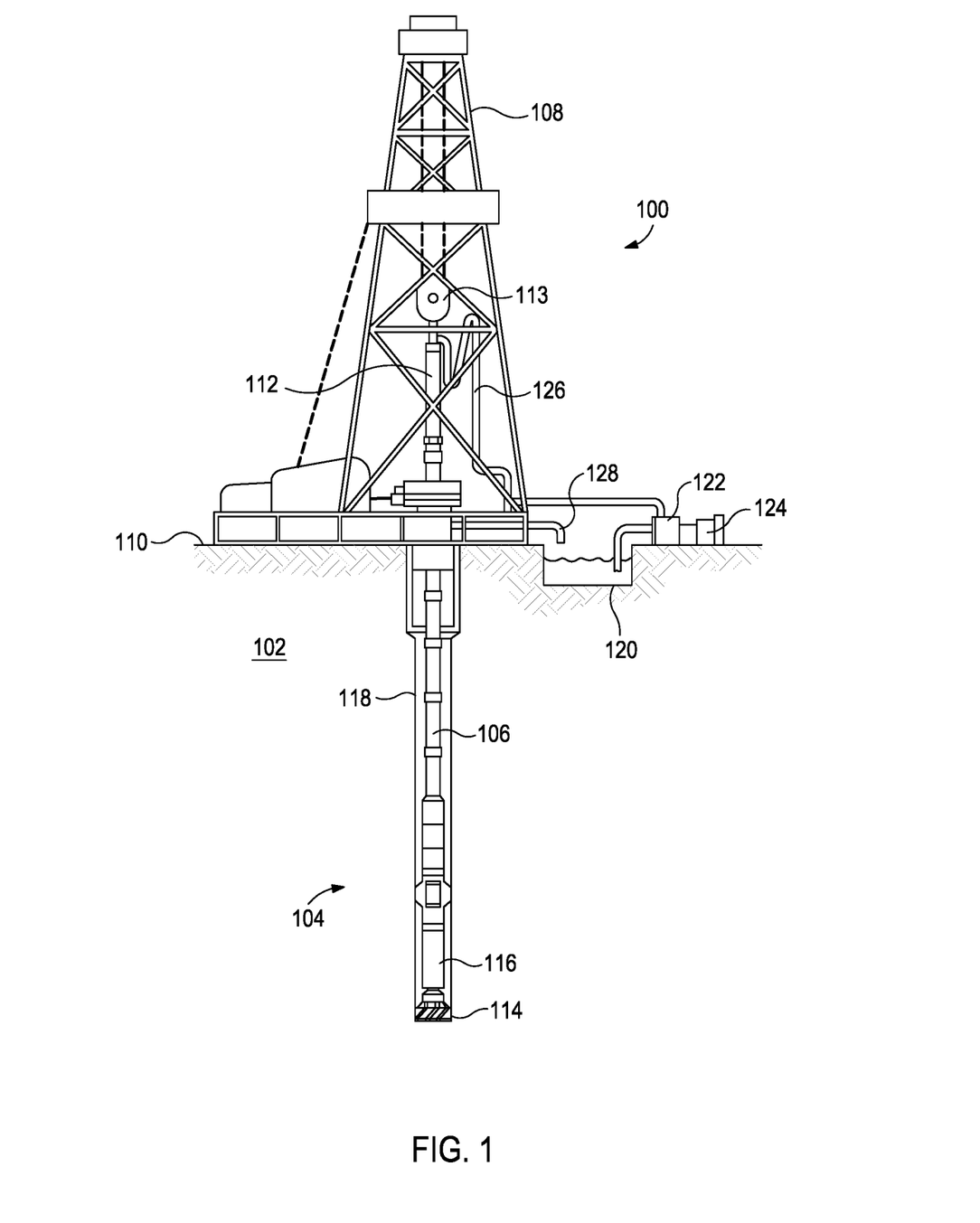
FIG. 1 is a schematic diagram of an example drilling system that may employ one or more principles of the present disclosure.

FIG. 1 is a schematic diagram of an example drilling system 100 that may employ one or more principles of the present disclosure. Boreholes may be created by drilling into the earth 102 using the drilling system 100. In the illustrated example, the drilling system 100 includes a bottom hole assembly (BHA) 104 positioned or otherwise arranged near the bottom of a drill string 106 extended into the earth 102 from a derrick 108 arranged at the surface 110. The derrick 108 includes a kelly 112 and a traveling block 113 used to lower and raise the kelly 112 and simultaneously lower and raise the drill string 106.

The BHA 104 includes a drill bit 114 operatively coupled to the end of a tool string 116 that extends axially within a drilled wellbore 118. During operation, the drill bit 114 is rotated to grind and cut into the underlying rock formations and thereby progressively penetrate the earth 102 to create the wellbore 118. The BHA 104 provides directional control of the drill bit 114 as it advances into the earth 102 and extends the wellbore 118. Fluid or "mud" from a mud tank 120 may be pumped downhole using a mud pump 122 powered by an adjacent motor 124. The mud is pumped from the mud tank 120 through a stand pipe 126, which feeds the mud into the drill string 106 and conveys the same to the drill bit 114. The mud exits one or more nozzles provided in the drill bit 114 and in the process cools the drill bit 114 as it operates. The mud then circulates back to the surface 110 via the annulus defined between the wellbore 118 and the drill string 106, and in the process returns drill cuttings and debris to the surface. The cuttings and mud mixture are passed through a flow line 128 and are processed such that a cleaned mud is returned down hole through the stand pipe 126 once again.

Although the system 100 is described herein with respect to drilling for hydrocarbons, the principles described herein may be equally applicable to other types of applications such as, but not limited to, drilling for mineral exploration, environmental investigation, natural gas extraction, underground installation, mining operations, water wells, geothermal wells, sub-surface boring applications and construction assemblies, disposal wells, and the like. Moreover, while the system 100 is depicted as a land-based operation, it will be appreciated that the principles of the present disclosure could equally be applied in any offshore, sea-based, or sub-sea application where the service rig may be a floating platform, a semi-submersible platform, or a sub-surface wellhead installation as generally known in the art.

The drill string 106 is made up of multiple pipes (alternately referred to herein as "tubular members" or "tubulars") threadably connected together end-to-end. During oil and gas drilling operations, it is desirable that the threaded connections forming the drill string 106 have sufficient strength to withstand all expected service loads (e.g., torsion, tension, compression, etc.). Particularly, it is desirable that the threaded connections have sufficient torsional strength, which is a measure of the amount of torque applied about the centerline of the tubular connection required to cause failure. In order to optimize the torsional strength of the drill string 106 threaded connections, the threads must be designed to have a sufficient bearing and shear strength to avoid the common failures resulting from elevated torsion. Bearing strength is a measure of the amount of force required to cause deformation (e.g., plastic deformation) of engaged surfaces (e.g., thread flanks) of the threaded connection, and shear strength is a measure of the amount of force required to shear the threads between the thread flanks along a plane substantially parallel to the connection centerline.

According to embodiments of the present disclosure, a threaded pipe connection can provide a thread profile that includes a crest, a root, and a transition surface extending between the crest and the root. The transition surface may include at least three arcuate surfaces and a straight line portion extending from a top of the crest toward the root at varying radii. The three consecutive and contiguous arcuate surfaces followed by the straight-line portion provides less contact area between opposing stab flanks as the opposing curved surfaces are drawn together while making up (i.e., threading) the pin to the box, which results in reduced friction forces. Hydraulic lock caused by pipe lubricants may also be mitigated while making up the pin to the box.

Figure 2:
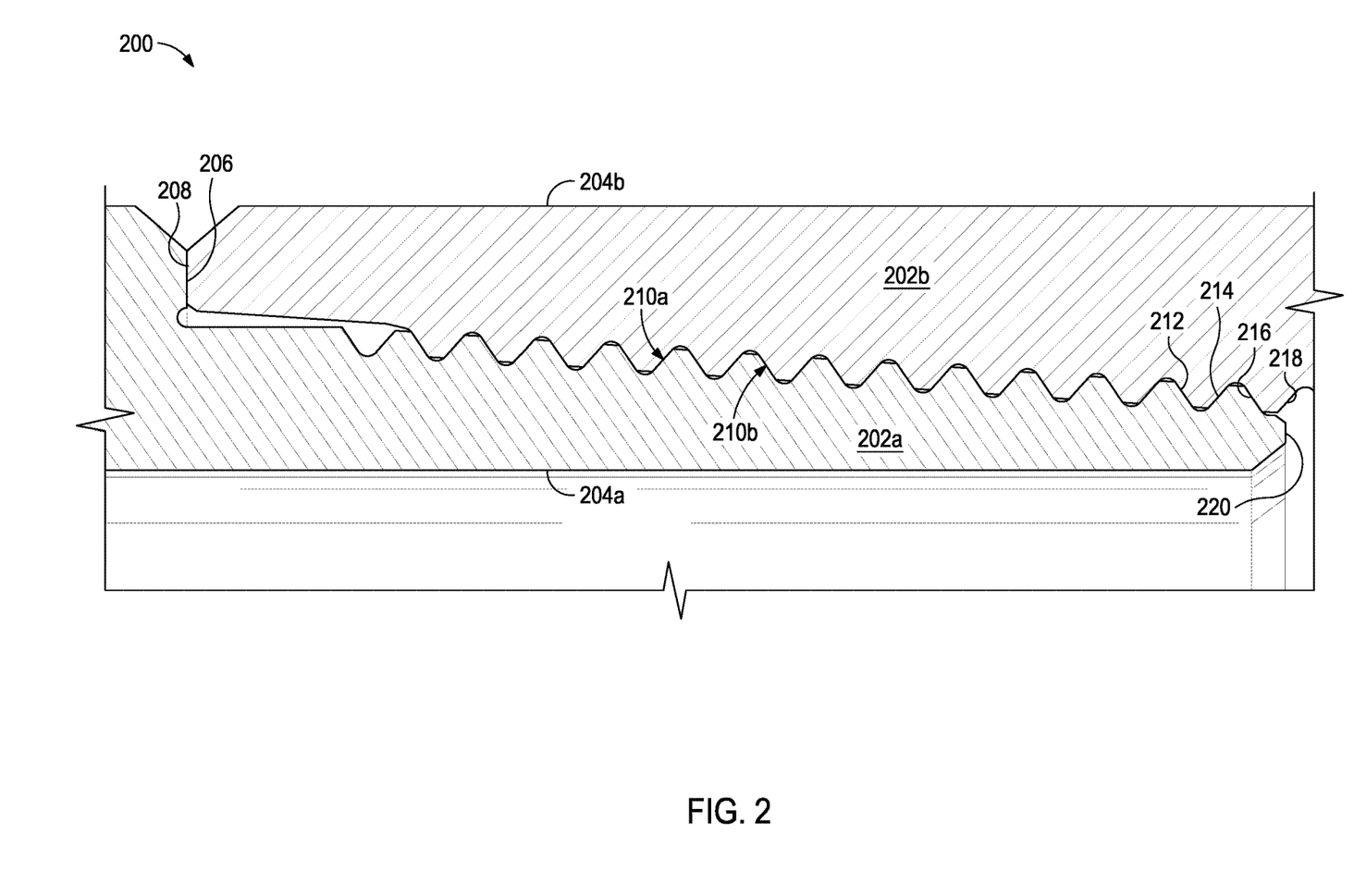
FIG. 2 is a cross-sectional side view of an example threaded connection that may incorporate the principles of the present disclosure.

FIG. 2 is a cross-sectional side view of an example threaded connection 200 that may incorporate the principles of the present disclosure. As illustrated, the threaded connection 200 (also referred to as a "tool joint") may include a pin 202a of a first tubular member 204a and a box 202b of a second tubular member 204b. The first and second tubular members 204a,b may comprise any type of tubing, pipe, or tubulars commonly used in the oil and gas industry and capable of being threadably connected end-to-end. Examples of the tubular members 204a,b include, but are not limited to, drill pipe, casing (or liner), production tubing, general tubular assemblies (e.g., a wellbore hanger, hydraulic fracturing tools, float equipment, etc.) and any combination thereof.

In the illustrated embodiment, the threaded connection 200 comprises a shouldered connection. As illustrated, the pin 202a includes an external shoulder 206 engageable with and end face 208 of the box 202b. In operation, the face 208 functions as a box shoulder engaging the external pin shoulder 206. In other embodiments, however, the threaded connection 200 may alternatively comprise an interference connection, or a combination shouldered and interference connection, without departing from the scope of the disclosure.

The pin 202a defines or otherwise provides a helically extending external thread profile 210a threadably engageable with a helically extending internal thread profile 210b defined or otherwise provided by the box 202b. The external thread profile 210a includes a stab flank 212 and a load flank 214, and the internal thread profile 210b similarly includes a stab flank 216 and a load flank 218. Accordingly, as the threaded connection 110 is made up, the stab flanks 212, 216 oppose each other, and the load flanks 214, 218 oppose each other.

As used herein, the term "thread profile" refers to the thread form or configuration of a thread in an axial plane and which is generally considered to include a crest, a root, and opposing stab and load flanks. Moreover, as used herein, the term "stab flank" is intended to designate those flanks of the pin and box threads that first engage as the pin is stabbed into the box, and the term "load flank" is intended to designate those contacting flanks of the pin and box threads that normally contact with an increasing bearing pressure in reaction to the load forces tending to separate the engaged pin and box axially.

Although not visible in FIG. 2, any gap between succeeding turns of the external and internal thread profiles 210a,b will progressively diminish, and the interference will increase between engaged threads after the gap closes in a direction from the engaged shoulder 206 and the end face 208 toward an axial end 220 of the pin 202a. Moreover, as torque is applied to the threaded connection 200, following engagement of the external shoulder 206 and the end face 208, the pin 202a will be drawn in tension and the box 202b will be pulled in compression.

Figure 3:
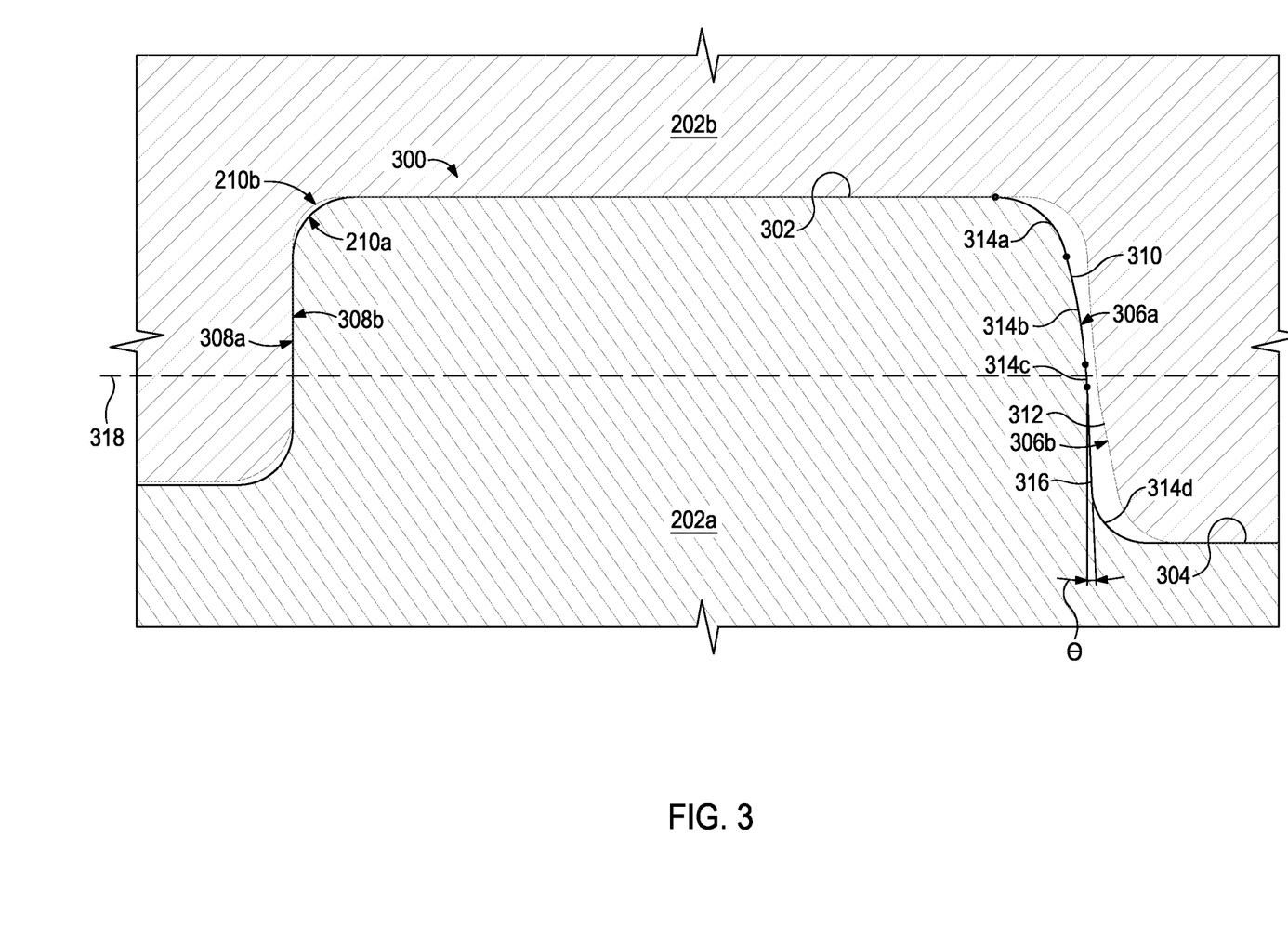
FIG. 3 is an enlarged cross-sectional side view of threaded engagement between the external and internal thread profiles of FIG. 2.

FIG. 3 is an enlarged cross-sectional side view of threaded engagement between the external and internal thread profiles 210a,b of FIG. 2. The following description is related to the external thread profile 210a of the pin 202a, but is equally applicable to the internal thread profile 210b of the box 202b. As illustrated, the external thread profile 210a provides a tooth 300 that defines a crest 302, a root 304, a stab flank 306a, and a load flank 308a. The stab and load flanks 306a, 308a oppose corresponding stab and load flanks 306b, 308b of the internal thread profile 210b of the box 202b. In some embodiments, the crest 302 and the root 304 define substantially flat surfaces that are parallel to one another.

According to one or more embodiments, a transition thread form or surface extends from the crest 302 to the root 304 and uses at least three consecutive and contiguous arcuate surfaces and a straight line surface extending from the last arcuate surface. More specifically, the stab flank 306a may comprise a transition surface 310 extending between the crest 302 and the root 304. The transition surface 310 may oppose a corresponding transition surface 312 provided on the stab flank 306b of the internal thread profile 210b. The transition surfaces 310, 312 may be substantially similar, except in reverse and otherwise oppositely formed. Accordingly, while the present discussion is related to the transition surface 310 extending from the crest 302 to the root 304 of the pin 202a, the principles of the present disclosure are equally applicable to the transition surface 312 extending from the root to the crest of the box 202b, without departing from the scope of the disclosure.

As illustrated, the transition surface 310 may define or otherwise provide a first arcuate surface 314a extending from the top of the crest 302 at a first radius R1. The first arcuate surface 314a transitions into a second arcuate surface 314b extending at a second radius R2, and the second arcuate surface 314b transitions to a third arcuate surface 314c extending at a third radius R3. The third arcuate surface 314c then transitions into a straight-line portion 316 that extends from the third arcuate surface 314c to the root 304 at an angle Θ. A fourth arcuate surface 314d extends from the straight-line portion 316 to the bottom of the root 304 at a fourth radius R4. Accordingly, in at least one embodiment, the transition surface 310 includes five contiguous and continuous surfaces, including the four arcuate surfaces 314a-d and the straight-line portion 316, extending from the crest 302 to the root 304.

In some embodiments, the first and third radii R1, R3 are smaller than the second radius R2. The first and third radii R1, R3, for example, may range between about 0.008 inches and about 0.015 inches in magnitude, and the second radius R2 may range between about 0.200 inches and about 0.400 inches. In at least one embodiment, the second radius R2 may be about 0.250 inches. Moreover, in some embodiments, the fourth radius R4 may be smaller than the first, second, and third radii R1, R2, R3. In such embodiments, the fourth radius R4 may range between about 0.005 inches and about 0.012 inches. The length or "arc length" of the second arcuate surface 314b will generally be longer or of a greater magnitude than the length of the first or third arcuate surfaces 314a, 314c.

As its name suggests, the straight-line portion 316 extends from the third arcuate surface 314c in a substantially straight line or course, with little or no curvature. The angle Θ of the straight-line portion 316 is measured from perpendicular to the pitch diameter line 318 of the tooth 300 (i.e., extending through the midpoint between the crest 302 and the root 304) and may range between about 2° and about 10° offset from perpendicular to the pitch diameter line 318. The angle Θ may be at least 1° greater than the angle of the load flank 308a, thus making the angle of the stab flank 306b at least 1° greater than the angle of the load flank 308a. During the manufacturing process for the thread profile, in order to produce or form the proper angle of the stab flank 308b, the insert needs to feed in at an angle that is at least 0.5° more to ensure that the finished angle is free from steps. If the insert is fed in at more than 1° than the angle, the stab flank 306b will not be free of steps as the tool is moving back more than the angle of the stab flank 306b and thereby leaving an un-machined surface outside the guidelines of the thread form finished product. As will be appreciated, however, the forgoing dimensions for the radii R1-R4 and the magnitude of the angle Θ may vary depending on the application.

In some embodiments, the third arcuate surface 314c may be centered at or near the pitch diameter line 318 of the tooth 300. Accordingly, the transition surface 310 includes three contiguous and continuous surfaces extending from the crest 302 to the pitch diameter line 318. The position of the third arcuate surface 314c, however, may change due to taper angle of the pitch line 318 based off of the center line axis of the connection. In operation, the third arcuate surface 314c may provide a surface and/or location on the tooth 300 configured to hold the load flank 308a in place, which helps reduce the chance of disengagement for compressive loads. More specifically, when fully engaged at the angle Θ, the load flank 308a will be unable to move up without rotation due to the overhang of the angles, and the load flank 308a will also be unable to move forward enough before contacting the third arcuate surface 314c to move up without rotation.

In some embodiments, if the profile form of the first, second, and third arcuate surfaces 314a-c were replicated and mirrored, an ellipse would be created by the combination. More specifically, if the arcuate paths of the arcuate surfaces 314a-c were to continue in a mirror-image replication, the combination of all the arcuate surfaces would generate an elliptical shape. This may prove advantageous over prior art thread forms in that it reduces the contact area between the opposing two surfaces and allows the load flank 308b to clear and as rotation is applied the load flank 308a backs into the angle of the mating load flank 308b.

At least one advantage to the three consecutive and contiguous arcuate surfaces 314a-c followed by the straight-line portion 316 is less contact area between the stab flank 306a of the external thread profile 210a and the opposing stab flank 306b of the internal thread profile 210b. In contrast to prior art thread forms that have opposing flat surfaces sliding together at the opposing stab flanks, the transition surfaces 310, 312 define opposing curved surfaces of opposing radii that are drawn together while making up (i.e., threading) the pin 202a to the box 202b. Consequently, there is less surface area contact (axial and radial) between the opposing stab flanks 306a,b during rotation (make-up), which results in reduced friction forces.

Another advantage to the three consecutive and contiguous arcuate surfaces 314a-c followed by the straight-line portion 316 is the mitigation of hydraulic lock while making up the pin 202a to the box 202b. More specifically, a lubricant (e.g., thread dope) is commonly applied on the internal and/or external thread forms 110a,b to help ease the make-up process. Once the pin 202a mates with the box 202b, contact will occur on the crest 302, the root 304, and the load flank 306a, and the lubricant will need somewhere to flow. Since the opposing transition surfaces 310, 312 combine multiple radii on the opposing stab flanks 306a,b, it opens up gaps on either side of the radius to receive and gather the lubricant. This not only helps to seal the connection, but also mitigate hydraulic lock.

Figure 4A:
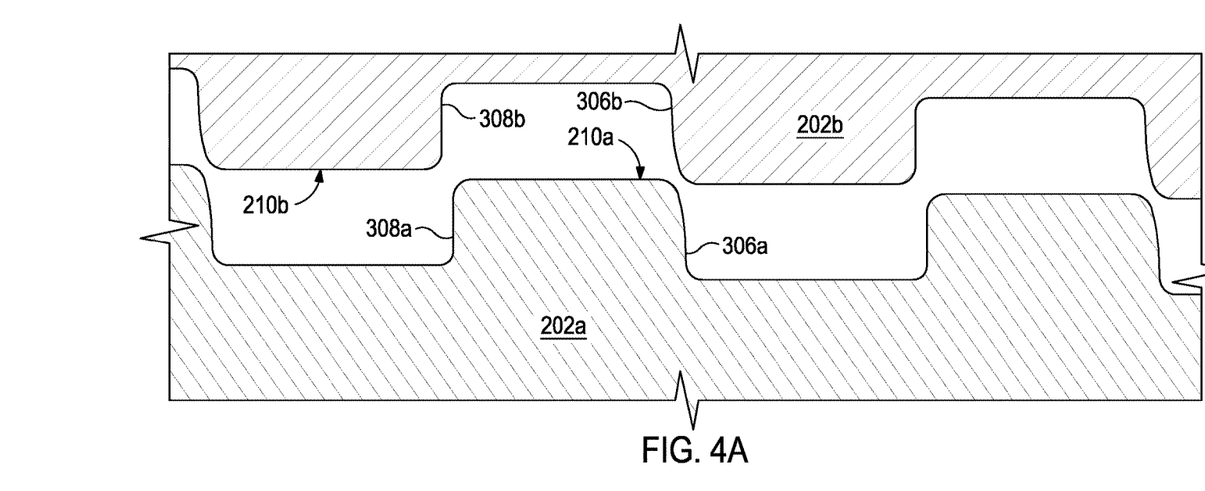
FIGS. 4A-4E are cross-sectional side views of the threaded engagement between the external and internal thread profiles of FIG. 2 showing progressive threaded engagement, according to one or more embodiments
Figure 4B:
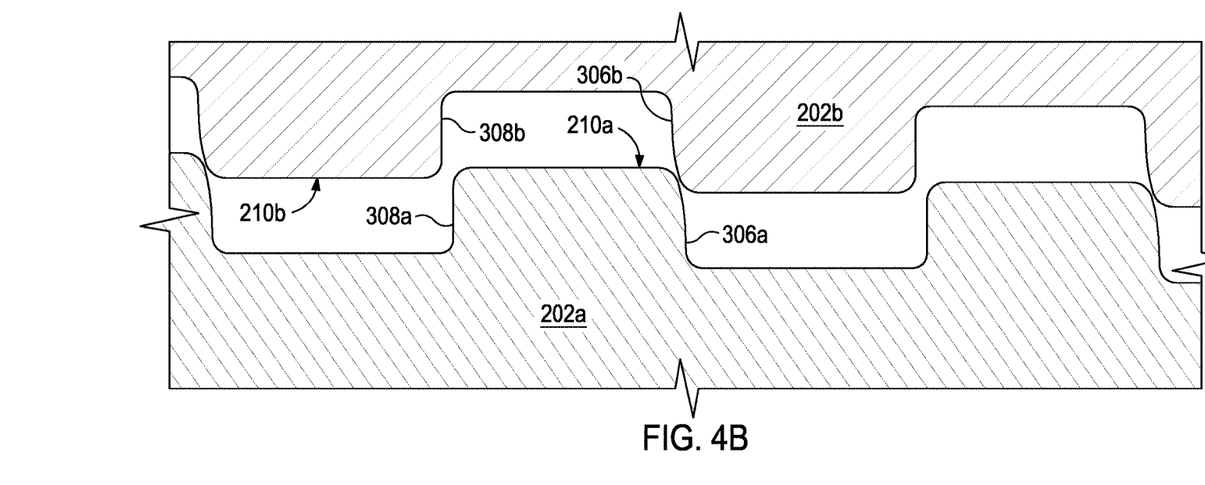
Figure 4C:
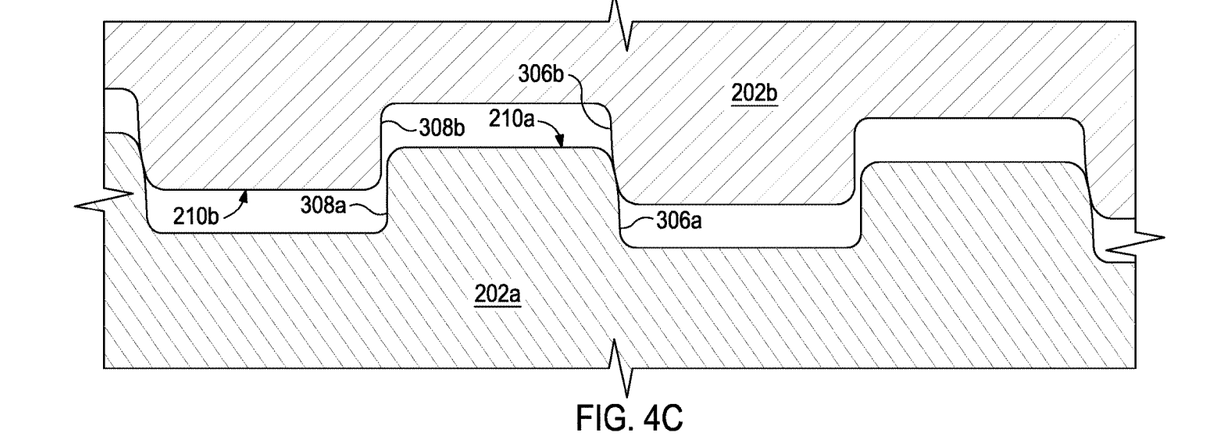
Figure 4D:
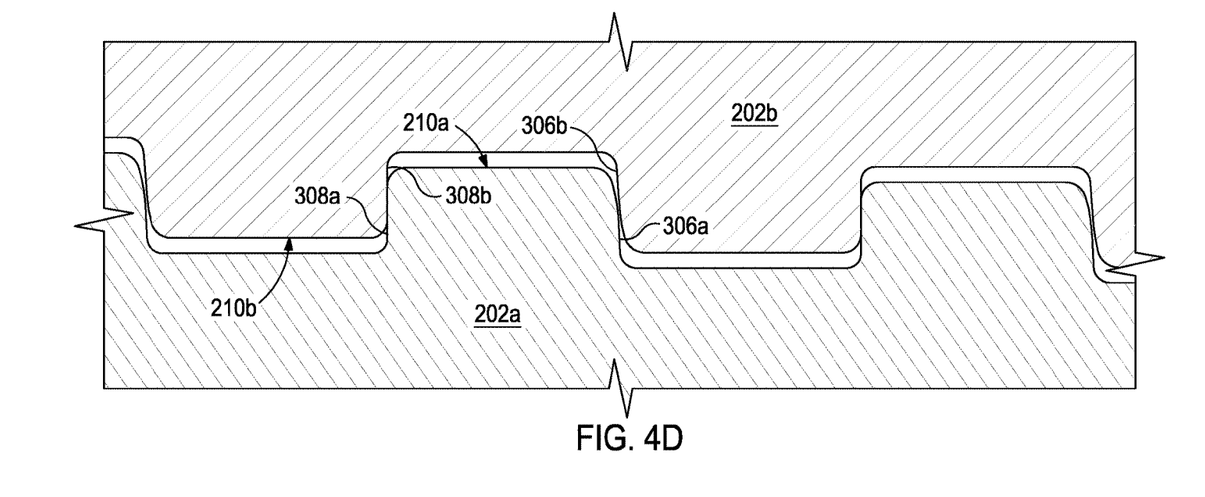
Figure 4E:
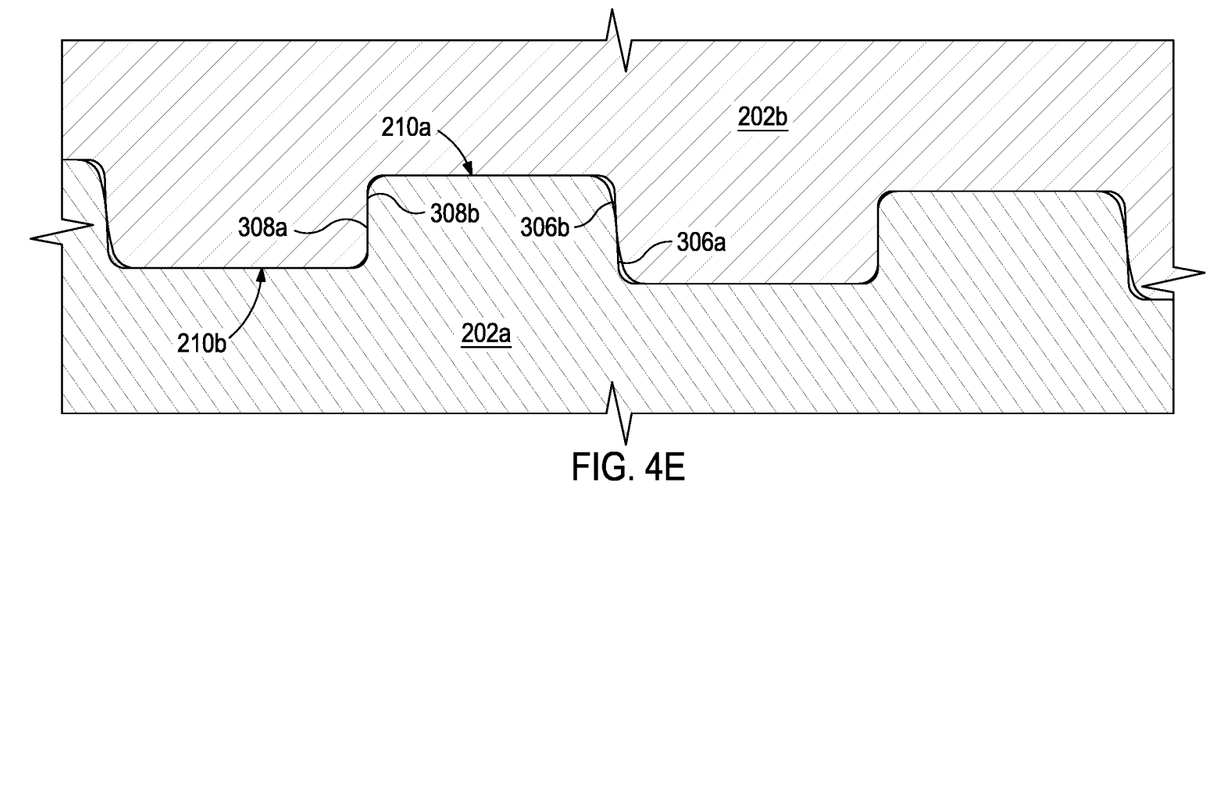

FIGS. 4A-4E are cross-sectional side views of the threaded engagement between the external and internal thread profiles 210a,b showing progressive engagement showing how the pin and box connections 202a,b come together during make up, according to one or more embodiments. As illustrated, when the pin and box connections 202a,b are stabbed together for make-up, the clearance between the opposing curved surfaces and radii of the two stab flanks 306a,b allows the load flanks 308a,b to clear each other. Moreover, during the make-up rotation, the radii of the stab flanks 306a,b close in a reverse axial movement, which correspondingly closes the distance between the load flanks 308a,b until fully engaged. As shown in FIG. 4C, the thread profiles 210a,b described herein allow the load flanks 308a,b to pass by each other until the stab flanks 306a,b make contact on their larger radii. Once the stab flanks 306a,b engage each other, a reactive force is created that drives the load flanks 308a,b together, as shown in FIG. 4D. The load flanks 308a,b come together due to the negative angle Θ (FIG. 3) of the straight-line portion 316 (FIG. 3).

Embodiments disclosed herein include:

A. A threaded connection that includes a first tubular member having a pin end defining external threads, a second tubular member having a box end defining internal threads threadably engageable with the external threads of the pin end, and a thread profile that defines at least a portion of one of the internal or external threads and includes a crest, a root, and a transition surface extending between the crest and the root, the transition surface comprising a first arcuate surface extending from a top of the crest at a first radius, a second arcuate surface extending from the first arcuate surface at a second radius, and a third arcuate surface extending from the second arcuate surface at a third radius, wherein the first radius and the third radius are each smaller than the second radius.

B. A thread profile that includes a crest, a root, and a transition surface extending between the crest and the root and comprising a first arcuate surface extending from a top of the crest at a first radius, a second arcuate surface extending from the first arcuate surface at a second radius, a third arcuate surface extending from the second arcuate surface at a third radius, and a straight-line portion extending from the third arcuate surface toward the root at an angle offset from perpendicular to a pitch diameter line extending through a midpoint between the crest and the root.

Each of embodiments A and B may have one or more of the following additional elements in any combination: Element 1: wherein the pin and box ends are threadably engaged in a shouldered connection, an interference connection, or a combination of shouldered and interference connection. Element 2: wherein the first and second tubular members are selected from the group consisting of drill pipe, casing, liner, production tubing, a general tubular assembly, and any combination thereof. Element 3: wherein the transition surface further comprises a straight-line portion extending from the third arcuate surface toward the root at an angle offset from perpendicular to a pitch diameter line of the thread profile. Element 4: wherein the transition surface further comprises a fourth arcuate surface extending from the straight-line portion to a bottom of the root at a fourth radius. Element 5: wherein the fourth radius is smaller than the first radius, the second radius, and the third radius. Element 6: wherein the first, second, and third arcuate surfaces extend from the crest to a pitch diameter line of the thread profile. Element 7: wherein the third arcuate surface is centered at the pitch diameter line. Element 8: wherein the thread profile is helical. Element 9: wherein the crest and the root comprise flat surfaces that are parallel to one another. Element 10: wherein the thread profile of the internal and external threads is provided on opposing stab flanks, and wherein the first, second, and third arcuate surfaces of each stab flank result in a minimal amount of surface area contact between the opposing stab flanks, and thereby reducing friction forces during make up.

Element 11: wherein the first radius and the third radius are each smaller than the second radius. Element 12: wherein the transition surface further comprises a fourth arcuate surface extending from the straight-line portion to a bottom of the root at a fourth radius. Element 13: wherein the fourth radius is smaller than the first radius, the second radius, and the third radius. Element 14: wherein the first, second, and third arcuate surfaces extend from the crest to the pitch diameter line. Element 15: wherein the third arcuate surface is centered at the pitch diameter line. Element 16: wherein the crest and the root comprise flat surfaces that are parallel to one another. Element 17: wherein the thread profile of the internal and external threads is provided on opposing stab flanks, and wherein the first, second, and third arcuate surfaces of each stab flank result in a minimal amount of surface area contact between the opposing stab flanks, and thereby reducing friction forces during make up.

By way of non-limiting example, exemplary combinations applicable to A and B include: Element 3 with Element 4; Element 4 with Element 5; Element 6 with Element 7; Element 12 with Element 13; and Element 14 with Element 15.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A threaded connection, comprising:
 a first tubular member having a pin end defining external threads;
 a second tubular member having a box end defining internal threads threadably engageable with the external threads of the pin end; and
 a thread profile that defines at least a portion of one of the internal or external threads and includes a crest, a root, and a transition surface extending between the crest and the root, the transition surface comprising:
  a first arcuate surface extending from a top of the crest at a first radius;
  a second arcuate surface extending from the first arcuate surface at a second radius; and
  a third arcuate surface extending from the second arcuate surface at a third radius,
 wherein the first radius and the third radius are each smaller than the second radius, and
 wherein the first, second, and third arcuate surfaces are consecutive and contiguous arcuate surfaces.

2. The threaded connection of claim 1, wherein the pin and box ends are threadably engaged in a shouldered connection, an interference connection, or a combination of shouldered and interference connection.

3. The threaded connection of claim 1, wherein the first and second tubular members are selected from the group consisting of drill pipe, casing, liner, production tubing, a general tubular assembly, and any combination thereof.

4. The threaded connection of claim 1, wherein the transition surface further comprises a straight-line portion extending from the third arcuate surface toward the root at an angle offset from perpendicular to a pitch diameter line of the thread profile.

5. The threaded connection of claim 4, wherein the transition surface further comprises a fourth arcuate surface extending from the straight-line portion to a bottom of the root at a fourth radius.

6. The threaded connection of claim 5, wherein the fourth radius is smaller than the first radius, the second radius, and the third radius.

7. The threaded connection of claim 1, wherein the first, second, and third arcuate surfaces extend from the crest to a pitch diameter line of the thread profile.

8. The threaded connection of claim 7, wherein the third arcuate surface is centered at the pitch diameter line.

9. The threaded connection of claim 1, wherein the thread profile is helical.

10. The threaded connection of claim 1, wherein the crest and the root comprise flat surfaces that are parallel to one another.

11. The threaded connection of claim 1, wherein the thread profile of the internal and external threads is provided on opposing stab flanks, and wherein the first, second, and third arcuate surfaces of each stab flank result in a minimal amount of surface area contact between the opposing stab flanks, and thereby reducing friction forces during make up.

12. A thread profile, comprising:
a crest;
a root; and
a transition surface extending between the crest and the root and comprising:
a first arcuate surface extending from a top of the crest at a first radius;
a second arcuate surface extending from the first arcuate surface at a second radius;
a third arcuate surface extending from the second arcuate surface at a third radius, wherein the first, second, and third arcuate surfaces are consecutive and contiguous arcuate surfaces, and wherein the first radius and the third radius are each smaller than the second radius; and
a straight-line portion extending from the third arcuate surface toward the root at an angle offset from perpendicular to a pitch diameter line extending through a midpoint between the crest and the root.

13. The thread profile of claim 12, wherein the transition surface further comprises a fourth arcuate surface extending from the straight-line portion to a bottom of the root at a fourth radius.

14. The thread profile of claim 13, wherein the fourth radius is smaller than the first radius, the second radius, and the third radius.

15. The thread profile of claim 12, wherein the first, second, and third arcuate surfaces extend from the crest to the pitch diameter line.

16. The thread profile of claim 15, wherein the third arcuate surface is centered at the pitch diameter line.

17. The thread profile of claim 12, wherein the crest and the root comprise flat surfaces that are parallel to one another.

18. The threaded connection of claim 12, wherein the thread profile of the internal and external threads is provided on opposing stab flanks, and wherein the first, second, and third arcuate surfaces of each stab flank result in a minimal amount of surface area contact between the opposing stab flanks, and thereby reducing friction forces during make up.

* * * * *